United States Patent [19]

Marshall et al.

[11] 4,058,643

[45] Nov. 15, 1977

[54] FIRE RETARDANT LAMINATES HAVING INTUMESCENT ADHESIVE LAYER COMPRISING SHELLAC

[75] Inventors: Jeffrey D. Marshall, Palmyra; Milton C. Kuklies, Fairport, both of N.Y.

[73] Assignee: Mobile Oil Corporation, New York, N.Y.

[21] Appl. No.: 698,387

[22] Filed: June 21, 1976

[51] Int. Cl.$^2$ .......................... A62D 1/00; B32B 7/14; B32B 9/02; B32B 17/06; C09D 3/40; C09D 5/18

[52] U.S. Cl. .............................. 428/198; 106/15 FP; 106/1.6; 252/5; 252/6; 252/7; 428/210; 428/285; 428/286; 428/317; 428/440; 428/497; 428/913; 428/920

[58] Field of Search ............. 106/16, 15 FP; 428/913, 428/920, 285, 291, 440, 497, 921, 286, 198, 210, 317; 252/5, 6, 7

[56] References Cited

U.S. PATENT DOCUMENTS

| | | |
|---|---|---|
| 3,157,613 | 11/1964 | Anderson et al. ...................... 106/16 |
| 3,284,216 | 11/1966 | Kaplan ..................................... 106/16 |
| 3,839,239 | 10/1974 | Godfried ................................. 106/16 |
| 3,915,777 | 10/1975 | Kaplan ..................................... 106/16 |
| 3,934,066 | 1/1976 | Murch .................................... 428/921 |
| 3,940,549 | 2/1976 | Whittam ............................... 428/921 |

FOREIGN PATENT DOCUMENTS

| | | |
|---|---|---|
| 2,104,968 | 4/1972 | France ................................... 428/921 |
| 557,545 | 11/1943 | United Kingdom ................... 106/16 |

OTHER PUBLICATIONS

Reaves, "Intumescent Solvent-Base Coating Systems" used in *Advances in Fire Retardants—Part* 1, (vol. 2 of Progress in Fire Retardancy Series), Bhatnagar edit., pp. 108-123, (1972).

*Primary Examiner*—J.C. Cannon
*Attorney, Agent, or Firm*—Charles A. Huggett; James D. Tierney

[57] ABSTRACT

A fire retardant laminate construction comprising a plastic backing film adhesively secured to an insulation batting material. The adhesive material comprises an intumescent coating, containing one or more fire retardant additives, which will foam and char at high temperatures to form a solid multicellular, fire retardant insulating layer which prevents wicking of the plastic material into the insulation batting.

9 Claims, No Drawings

FIRE RETARDANT LAMINATES HAVING INTUMESCENT ADHESIVE LAYER COMPRISING SHELLAC

BACKGROUND OF THE INVENTION

1. Field of the Invention

The present invention relates to fire retardant intumescent coating compositions which are employed as adhesive materials for the lamination of plastic film support backing to insulation battings.

2. Description of the Prior Art

Numerous patents and literature references exist in the field of fire retardant compounds and compositions useful as additives and/or coatings for films, including polyolefin films such as polyethylene, polypropylene, polybutene and the like. Such prior art fire retardant materials are generally extremely costly and are usually tailored to treat the effects and contain flame propagation rather than to eliminate the cause of the fire propagation.

When thin flexible film of polyolefins are ignited, the film shrinks away from the applied flame at a rate faster than the flame front velocity and thus appears to be self-extinguishing. However, with continued flame application, olefins become molten and drop and thus support flame. When polyolefins are used in laminar constructions, e.g., as backing material for insular battings such as fiber glass batting, the adhesive which bonds the film to the batting prevents the film from shrinking away from a flame front and the flame is readily propagated. Additionally, the heated polyolefin becomes molten and wicks into the batting layer thereby spreading the combustion.

SUMMARY OF THE INVENTION

The present invention relates to a laminar construction comprising a thermoplastic film which is adhesively secured to a layer of an insulation batting. The adhesive component of the lamination is one which is flame retardant and preferably intumescent in nature, i.e. an adhesive coating which bubbles and foams at high temperatures to form a multicellular insulating layer.

DESCRIPTION OF SPECIFIC EMBODIMENTS

In accordance with the present invention, laminar structures are provided which exhibit good flame retardancy. In particular, laminar constructions comprising a layer of film that is adhesively bonded to a layer of non-flammable insulation material such as, for example, fiber glass. Insulation batting is desirable provided with some form of backing material which, when adhered to the insulation, serves to secure the insulation material in place and facilitate handling thereof. The backing must be flexible and capable of acting as a vapor barrier. The backing also serves to keep the insulation batting in a log condition.

In the past, such backing materials have usually been fabricated from paper or metallic foil materials since such materials are either inherently flame retardant or could easily be rendered flame retardant by the employment of conventional additives or coatings or by impregnation with a fire retardant material. In one embodiment of the present invention backing materials such as foil and/or paper are replaced employing plastic films such as polyolefins including, for example, polyethylene. Applicants have found that polyethlene films, while flammable by nature, may be modified to make them suitable for employment as backing for insulation. In accordance with a particular aspect of the present invention it has been found that when specially formulated intumescent coatings are applied to the film surface, such coatings serve as an adhesive to bond the film to the insulation as well as impart flame retardant properties to the film.

In general, intumescent coatings foam at high temperatures to form an insulating layer, such coatings contain at least four basic compounds including:

1. An Acid Source, preferably Phosphoric
2. A Carbonaceous Residue Source
3. A Blowing Agent
4. A Solvent In some instances, it may be desirable to add additional compounds to the coating including resin binders which serve to improve the flexibility of the coating after it has been applied to the substrate film.

In order for intumescence to occur upon exposure to high temperatures such as those generated by an ordinary flame, several distinct reactions take place in sequence. First, an acid salt, such as ammonium phosphate, decomposes to yield phosphoric acid which reacts with a highly carbonaceous polyol, including starch or erythritol, to form a clear melt which later becomes a char. Simultaneously, gases, such as ammonia, carbon dioxide, water vapor and hydrogen chloride, are evolved from blowing agents, such as melamine and chlorinated parafin, which gives off bubbles as the liquid mass darkens and gelation occurs forming a multicellular structure. A binder, such as polyvinyl acetate or vinyl toluene-butadiene copolymer, may be employed to hold the intumescent fillers, and the solvent is added to control the viscosity. Organic or aqueous solvents may be employed.

It has been found that in formulating the intumescent adhesive coatings for employment in the laminar structures of the present invention, that the acid source may be obtained from a plurality of materials including monoammonium phosphate, diammonium phosphate, ammonium polyphosphate, malamine phosphate, guanylurea phosphate, urea phosphate, ammonium sulfate and ammonium borate. The ammonium phosphates have been found particularly effective acid source materials for purposes of the present coating compositions.

The carbonaceous residue source materials employed in the present adhesive coating may include material such as sugars, e.g., glucose and maltose, polyhydric alcohols including erythritol, pentaerythritol, sorbitol and the like, and starches. In accordance with one specific embodiment of the present invention, it has been found that, in addition to the foregoing carbonaceous residue source materials, shellac provides an excellent foamed char residue when it is employed in the fire retardant adhesive coating compositions of the present invention.

Shellac has been found to be a preferred carbonaceous residue source material in view of the many advantages it offers in the adhesive composition portion of the laminar structures of the present invention. Shellac exhibits an ability to maintain its adhesive properties with very high loadings of other additive compounds which may be present in the adhesive coating composition. Shellac does not drip or migrate from the flame source and, thereby, eliminates undesirable wicking of the plastic material, such as polyethylene, into the insulation batting leaving the flame retardant additives in the coating behind. Further, it has been found that shellac-based adhesives do not degrade or lose their holding power over extended periods of time which is an essential feature, for example in holding and maintaining insulation materials in a fixed location in building construction. Shellac-based adhesives are non-toxic, non-fuming and do not produce objectionable smoke when they are subjected to combustion temperatures. As hereinabove noted, the shellac compositions assist in the formation of hard char surface at the point of combustion and are easily adaptable for employment from either an aqueous or an organic solvent media.

Suitable blowing agents which may be incorporated into the intumescent coating compositions include melamine, guanidine, glycerine, urea and chlorinated paraffin, the latter having been found to be especially effective in the present coatings.

The selection of the aforedescribed components must be carefully made to produce an effective intumescent coating system. For example, in order for intumsecence to occur, several distinct reactions must occur nearly simultaneously, but in proper sequence. The acid salt must first decompose to yield the dehydrating acid which, secondly, must react with the carbonaceous residue source. Next, the carbonaceous material must begin to char simultaneously with the evolution of gas from the blowing agent. If any one of these reactions does not proceed at the required time, intumsecence will not occur.

In one specific embodiment of the flame retardant laminar structures of the present invention, the intumescent adhesive coating is applied between the film support layer and the insulation batting as a non-continuous coating. That is, the intumescent coating is applied in a patterned fashion in the form of horizontal and/or vertical stripes or in a grid work contiguous of rectangles, diamonds or other continguous geometric figures. Such a discontinuous coating improves the flexibility of the coated film substrate. Additionally, in the event ignition of an uncoated portion of the film substrate occurs the uncoated film area, which is not adhered to the batting layer, shrinks away from the flame front without melting and wicking into the batting.

As the flame front advances to that portion of the film which is adhered to the batting, the adhesive coating intumesces and retards or completely stops flame advancement.

In accordance with a specific embodiment of the present invention it has been found that the concentration of carbonific material, preferably shellac, in the intumescent coating may range from about 40% to about 70% by weight and preferably from about 50% to about 70% based upon the weight of active coating components; the concentration of the acid salt component, preferably a fire extinguishing grade of ammonium phosphate, may range from about 20% up to about 70% by weight and preferably from about 20% to about 50%; and in the event an additional source of carbon and blowing agent is employed in the coating formulation, e.g. chlorinated paraffin, such concentrations may vary from about 0.0% up to about 45% and preferably from about 2% up to about 40% by weight.

The following examples are employed to illustrate specific embodiments of the laminar structures of the present invention and accordingly are not intended to be construed in a limiting sense.

The formulations were prepared from commercially available 5 pound cut shellac (i.e. five pounds of shellac per gallon of alcohol) such as Parks pure shellac maufactured by Parks Corp. of Somerset, Mass. from which shellac and methanol. The shellac was measured into a beaker and manually agitated while the other ingredients were added. Although the order of addition is not critical, the chlorowax and other components will settle if the solution is not continuously agitated.

The coating formulation employed was about 16% chlorowax, identified by the manufacturer as Diamond Shamrock 70-S, 57.7% of the five pound cut shellac, and 26.3% monoammonium phosphate. This mixture is applied with a brush to uniformly coat one side of a test material, allowed to dry, and subsequently subjected to ignition testing.

The test material used for screening this formulation was ⅛ inch sheet of foamed polystyrene such as is commercially sold for institutional food trays. One side of the 4 × 10 inch test sheet was coated with the fire retardant formulation in a continuous pattern and dryed for 3 hours in a 140° F circulating air oven.

Ignition was tested by attempting to light the material with a match along the bottom (4 inch) side of the coated test material. When match ignition failed a propane torch was applied to the bottom of the sample (which is hanging in a vertical plane) for 10 seconds and withdrawn. Following this test if ignition still was unsuccessful the torch was applied and the torch was raised with the char front to determine if ignition could be started with more flame exposure.

In the case of the above formulation, all of these ignition test failed to start ignition that would support itself when the flame or torch was removed.

A coating formulation that passed the aforedescribed initial ignition test was then tested as a simulated product where polyethylene film was brush coated with the formulation then manually adhered to a 1 ½inch thick fiberglass batting the same size as the test films. This laminate construction was then dried overnight in an oven and subjected to the series of the flamability tests described above progressing from match ignition through following the char front up the surface of a vertical sample with a propane torch. All tests failed to provide a self supporting flame within 2 seconds of removal of the source of ignition.

The third series of test samples used a discontinuous pattern or grid of lines of the retardant/adhesive composition. The grid pattern allows a heavy bead of adhesive to be formed every ½ to 1 ½inches which effectively stops the flame front while the heat from the flame also shrinks the polyolefin films away from the flame faster than the flame propagation velocity. The film tends to shrink to the nearest retardant bead and not to wick into the film in this method of adhering the samples.

In preparing the third series of test samples a glass rod was used to transfer the shellac retardant/adhesive formulation from the beaker into irregular wave like grids of non intersecting lines of the formulation on the surface of polyethylene film. The film in this case contained a fire retardant additive identified as "Flameguard" by the manufacturer at a 5% by weight loading. A fiber glass batting was then pressed onto the film and it adhered at the retardant adhesive composition grid lines. The sample was dried overnight in a 140° F oven prior to the series of tests. Self supporting ignition again did not occur.

A number of formulations were examined to determine the optimum formulations. Three of the other most successful compositions tested (i.e. samples failed to ignite) are listed below:

50% shellac
50% ansul monoammonium phosphate
Could not burn samples made as type 1, 2 or 3 samples above
68% shellac
23% 500 C. Diamond Shamrock Chloroparaffin 30% monoammonium phosphate
Could not burn any samples
57% shellac
2% 500 C. chloroparaffin
20% monoammonium phosphate
21% oxidry starch
Sample failed to ignite Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A laminate construction comprising a plastic film layer bonded, with an intumescent adhesive coating composition, to an insulation batting layer, said adhesive composition comprising a mixture of shellac, a phosphoric acid salt and a blowing agent said adhesive coating, when exposed to elevated temperatures, swells by foaming to form a protective multicellular char layer.

2. A laminate in accordance with claim 1 wherein said plastic film is a member selected from the group consisting of polyethylene, polypropylene, polybutene, polyvinylchloride and copolymers and blends thereof.

3. A laminate in accordance with claim 1 wherein said insulation batting comprises fiber glass.

4. A laminate, as defined in claim 1, wherein said acid salt comprises a member selected from the group consisting of ammonium phosphate, melamine phosphate, guanylurea phosphate, and urea phosphate; and said blowing agent comprising a member selected from the group consisted of melamine, guanidine, glycerine, urea and chlorinated paraffin.

5. A laminate in accordance with claim 1 wherein said adhesive comprises a continuous coating at the interface bewteen said film layer and said batting layer.

6. A laminate in accordance with claim 1 wherein said adhesive comprises a discontinuous coating at the interface of said plastic film layer and said batting layer.

7. An adhesive coating composition comprising a mixture of shellac, a phosphoric acid salt, and a blowing agent.

8. An adhesive coating composition in accordance with claim 7 comprising a mixture of from about 30 to about 70 weight percent of shellac; from about 10 to about 50 weight percent of said phosphoric acid salt; and from about 1 to about 20 weight percent of said blowing agent.

9. An adhesive coating composition in accordance with claim 7 wherein said phosphoric acid salt comprises ammonium phosphate.

* * * * *

UNITED STATES PATENT AND TRADEMARK OFFICE
CERTIFICATE OF CORRECTION

PATENT NO. : 4,058,643
DATED : November 15, 1977
INVENTOR(S) : JEFFREY D. MARSHALL and MILTON C. KUKLIES It is certified that error appears in the above-identified patent and that said Letters Patent are hereby corrected as shown below:

| | |
|---|---|
| Assignee | "Mobile" should read --Mobil--. |
| Column 3, line 36 | "grid work contiguous" should read --grid work pattern--. |
| Column 4, line 2 | "from which" should read --from white--. |
| Column 4, line 18 | "4 x 10 inch" should read --4" x 10"--. |
| Column 4, line 49 | "1/2 to" should read --1/2" to--. |
| Column 5, line 10 | Delete "30%" and insert --30%-- on line 11. |

Signed and Sealed this

Eighteenth Day of April 1978

[SEAL]

Attest:

RUTH C. MASON
Attesting Officer

LUTRELLE F. PARKER
Acting Commissioner of Patents and Trademarks